Patented Apr. 18, 1944

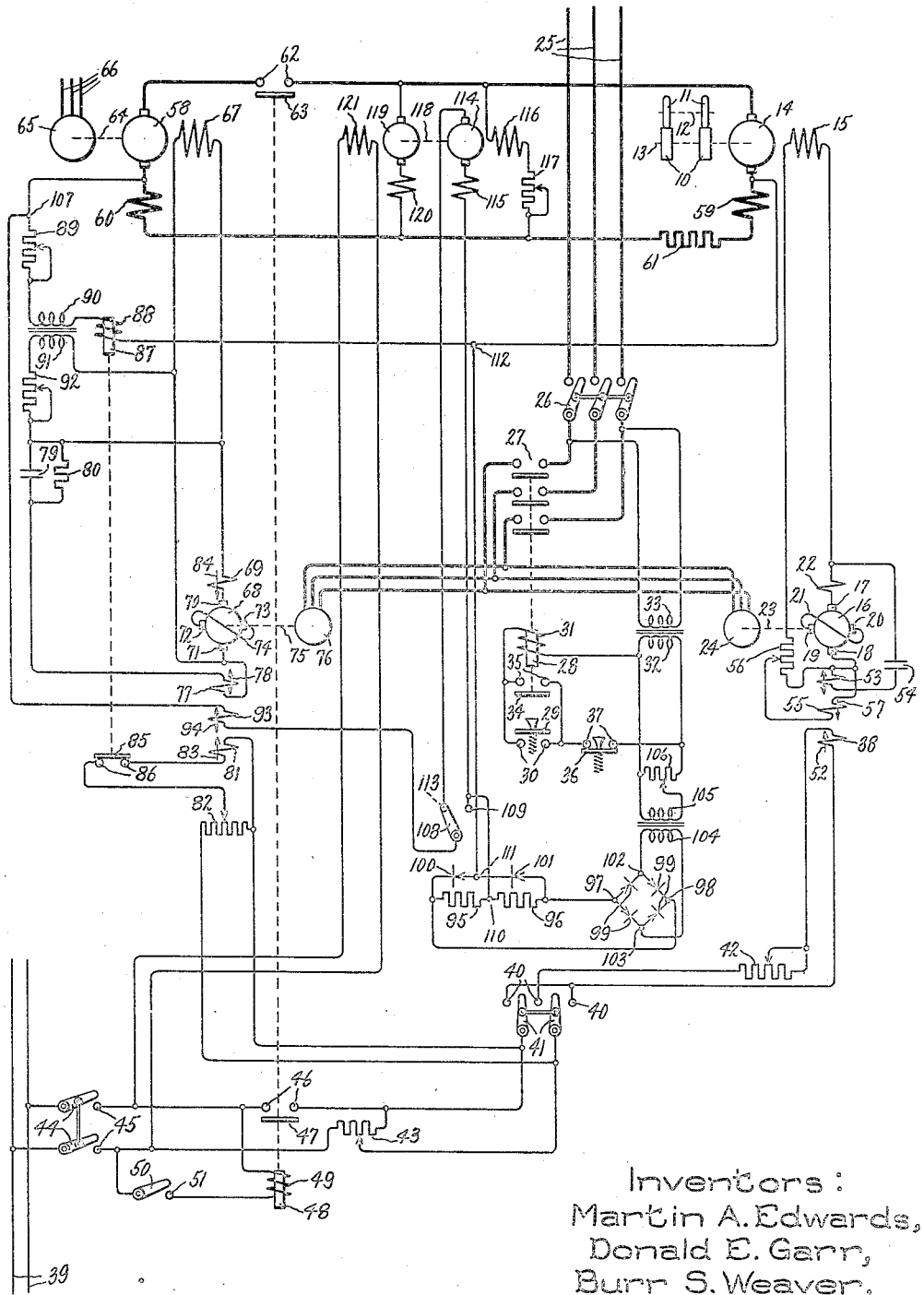

2,347,037

UNITED STATES PATENT OFFICE 2,347,037

TEST SYSTEM

Martin A. Edwards, Scotia, Donald E. Garr, Schenectady, and Burr S. Weaver, Scotia, N. Y., assignors to General Electric Company, a corporation of New York Application January 11, 1943, Serial No. 471,962

16 Claims. (Cl. 172—239)

Our invention relates to test systems and more particularly to such systems as are used in connection with testing the power developed by tractive elements such as the wheels of a vehicle.

An object of our invention is to provide an improved test system wherein a substantial amount of the power developed by the device under test is transferred through an electrical connection to a source of electrical power supply.

Another object of our invention is to provide an improved test system wherein the device being tested may be loaded substantially in accordance with normal loading operating conditions by varying the load on the device from a load absorbing to a power developing type load.

A further object of our invention is to provide an improved test system wherein the load on the device tested may be varied in response to substantially the square of the speed of the device and also from a load developing to a load absorbing type of operation.

Further objects and advantages of our invention will become apparent and our invention will be better understood from the following description referring to the accompanying drawing, and the features of novelty which characterize our invention will be pointed out with particularity in the claims annexed to and forming part of this specification.

The drawing schematically illustrates an embodiment of our improved test system.

Referring to the drawing, we have shown our improved test system in connection with a chassis dynamometer which includes a pair of frictional load engaging rotatable roller members 10 adapted to engage the treads of a pair of wheels 11 mounted on a drive axle 12 of a traction vehicle. The load engaging or loading roller members 10 are mounted on a drive shaft 13 which is mechanically connected to a rotatable member 14 of a dynamo-electric machine. This dynamo-electric machine is adapted to be operated as a generator to absorb the torque developed by the drive wheels 11 to simulate the load on these wheels when they are used to drive a vehicle, and the dynamo-electric machine also is adapted to operate as a motor for driving the wheels 11 through the loading members 10 to simulate the loading on the wheels when the vehicle is operated on a down grade, such that the vehicle tends to drive the drive wheels 11. This first dynamo-electric machine is provided with a control field exciting winding 15 which is adapted to be energized so as to induce a voltage in the rotatable member or armature 14 of the machine of a predetermined desirable value to enable the rotatable member 14 to develop a motoring or generating torque. This field exciting winding 15 is connected across an armature 16 through secondary brushes 17 and 18 of an armature reaction excited dynamo-electric machine, such as an amplidyne exciter generator. The exciter generator armature 16 is provided with a set of primary brushes 19 and 20 which are short-circuited by a conductor 21 to provide a primary circuit through the armature 16, and a compensating field exciting winding 22 is connected in series with the secondary brush 17 and the first dynamo-electric machine field exciting winding 15 to provide a conventional secondary compensating component of excitation to the machine. The exciter armature 16 is mechanically connected by a suitable shaft 23 to a driving motor 24 which is adapted to be electrically energized from a source of electrical power supply 25 through a switch 26 and the contacts 27 of a control relay 28. This driving motor is adapted to be started by closure of a contactor 29 on contacts 30 of a starting switch which completes a circuit through an operating coil 31 of the relay 28 and a secondary winding 32 of a transformer, the primary winding 33 of which is connected across the source of electrical power supply 25. By closing the main switch 26 and then depressing the contactor 29 to complete a circuit across the contacts 30, the relay operating coil 31 is energized so as to operate the relay 28 to close the motor circuit through the relay contacts 27 and also to close a holding circuit for the relay coil 31 through a relay operated contactor 34 connected to the relay 28 so as to close a circuit between relay contacts 35 connected across the contacts 30 of the starting switch, such that when the starting switch contactor 29 is released, the operating coil 31 of the relay 28 remains energized through the circuit including the contactor 34 and the contacts 35. When it is desired to open the circuit from the source of electrical power supply 25, a contactor 36 is depressed and opens the circuit between contacts 37 which deenergizes the relay operating coil 31 and thereby opens the circuits between the relay contacts 27 and the relay contacts 35. This deenergizes the exciter operating motor 24 and removes excitation from the first dynamo-electric machine field exciting winding 15. This operation of the relay 28 is also adapted substantially to remove voltage from across the armature 14 of the first dynamo-electric machine through another part of the system. The amplidyne exciter is provided with a control field exciting winding 38 adapted to provide a component of excitation along the secondary commutating axis of the exciter generator, and this field exciting winding is arranged to be connected across a direct current source of electrical power supply 39 for energization in either of two directions by a reversing switch having contacts 40 and contactors 41. The energization of this field exciting winding 38 may be controlled by a variable resistor 42 connected between the field exciting winding 38 and the reversing switch contacts 40 and also by a variable potentiometer 43 across which the contactors 41 of the reversing switch are connected. The potentiometer 43 is adapted to be energized by the source of electrical power supply 39 through a main line switch having contactors 44 arranged to close a circuit through switch contacts 45 connected across the potentiometer 43 through relay contacts 46 and a relay contactor 47. The relay contactor 47 is adapted to close this circuit by operation of the relay 48 when a relay operating coil 49 is energized. This relay operating coil 49 is connected across the source of electrical power supply 39 through the line switch contactors 44 and contactors 45 and a control switch contactor 50 and contact 51. Closure of the circuit through the switch contactor 50 and contact 51 energizes the relay operating coil 49 and connects the potentiometer 43 across the source of electrical power supply 39 and thereby provides energization to the amplidyne excited generator field exciting winding 38, as indicated by the arrow 52. A stabilizing field exciting winding 53 is connected through a capacitor 54 across the secondary circuit of the exciter generator armature 16 so as to provide a conventional stabilizing component of excitation to the exciter generator in opposition to any transient variations in the secondary voltage of the machine. A temperature compensating field exciting winding 55 is connected across a variable resistor 56 which is connected in series with the secondary circuit of the armature 16, and this field exciting winding is arranged to provide a component of excitation in opposition to the control component of excitation 52, as indicated by the arrow 57. With this arrangement, the energization of the field exciting winding 38 is adjusted to provide the desired voltage across the first dynamo-electric machine field exciting winding 15, and as the exciter generator heats up, the increased resistance of the circuits of the generator will tend to lower the voltage across the first dynamo-electric machine field exciting winding 15, but this lowering of the voltage will result in a reduced drop across the variable resistor 56, such that the energization of the temperature compensating field exciting winding 55 is reduced and the net excitation produced by the field exciting windings 55 and 38 in opposition to each other is restored substantially to its original desired value. This produces a substantially inherent control of the secondary voltage of the exciter generator which maintains substantially constant this secondary voltage for any given setting of the control resistances 42 and 56 and of the potentiometer 43. The amount of excitation provided by the temperature compensating field exciting winding 55 can be varied by varying the variable resistance 56. The general operation of this type dynamo-electric machine is fully explained in Patent No. 2,227,992, Alexanderson and Edwards, January 7, 1941, assigned to the assignee of this application.

The first main dynamo-electric machine armature 14 is adapted to be connected across the rotatable member or armature 58 of a second main dynamo-electric machine, and both of the armatures 14 and 58 are provided with commutating field exciting windings 59 and 60, respectively, which are connected in series with the armatures and with a resistor 61. The circuit which electrically connects together the armatures 14 and 58 includes a pair of contacts 62 which are adapted to be closed by a relay contactor 63 operated by the relay 48 to complete this electrical circuit when the relay operating coil 49 is energized. The second main dynamo-electric machine armature 58 is mechanically connected by a suitable shaft 64 to a third main dynamo-electric machine, preferably of the synchronous type, having a rotatable member 65 and being electrically connected to a source of electrical power supply 66. The second main dynamo-electric machine is provided with a control field exciting winding 67 connected across an armature 68 of a second armature excited dynamo-electric machine, such as an amplidyne exciter generator, through a conventional secondary compensating field exciting winding 69 and secondary commutating brushes 70 and 71. The armature 68 is provided with primary brushes 72 and 73 which are short circuited by an electrical conductor 74 to complete the primary circuit through the armature 68. This armature 68 is mechanically connected by a suitable shaft 75 to a rotatable member 76 of a driving motor which is electrically connected to the source of electrical power supply 25 through the main line switch 26 and the relay contacts 27. Operation of the motor 76 is controlled by the same circuit including the relay 28 which controls the motor 24. A stabilizing or anti-hunt field exciting winding 77 is arranged to provide a component of excitation indicated by the arrow 78 along the secondary commutating axis of the exciter generator armature 68 under transient voltage variations of the secondary voltage of the armature to induce a voltage in the armature in opposition to these transient variations, and is connected across the secondary circuit of the exciter generator armature 68 through a capacitor 79 across which a resistance 80 is connected. This connection of the resistance 80 provides a circuit for energizing the field exciting winding 77 such that when a voltage is generated across the secondary brushes 70 and 71, it tends to cause a current to flow through the resistor 80 and the field exciting winding 77, and this winding is arranged on the machine such that its excitation tends to induce a voltage in the armature 68 in opposition to the voltage which caused the current to flow through the resistance 80 and the field exciting winding 77, thereby tending to prevent the "building up" of a voltage between the secondary brushes 70 and 71. This field exciting winding, however, is arranged to provide such a component of excitation relative to the component of excitation provided by a control field exciting winding 81 that the exciter generator armature 68 actually does build up and provide a voltage between the secondary brushes 70 and 71 when the control field exciting winding 81 is energized. However, deenergization of the control field exciting winding 81 removes the control component of excitation provided by this field exciting winding, and the field exciting winding 77 then tends to prevent the generation of a voltage between the secondary brushes 70 and 71 and to reduce this voltage rapidly to substantially zero. Thus, deenergization of the control field exciting winding 81 insures a rapid decrease in the secondary voltage of the armature 68 and, therefore, a rapid deenergization of the control field exciting winding 67 of the second main dynamo-electric machine. The control field exciting winding 81 is adapted to be energized from the direct current separate source of excitation 39 and is connected across a variable potentiometer 82 which is connected across the variable potentiometer 43. Thus, the energization of the field exciting winding 81 can be controlled by both the variable potentiometers 43 and 82. This control field exciting winding 81 is adapted to provide a component of excitation along the secondary commutating axis of the second amplidyne exciter generator, as indicated by the arrow 83, in opposition to the compensating component of excitation indicated by the arrow 84 and provided by the compensating field exciting winding 69. It is desirable that the current through the main dynamo-electric machine armatures 14 and 58 should be limited to a predetermined maximum safe operating value. This maximum current can be controlled by controlling the current in the electrical connection between these two armatures and is obtained in the illustrated system by controlling the excitation provided by the control field exciting winding 67 to the armature 58 of the second main dynamo-electric machine and thereby control the voltage of the machine. By intermittently removing the excitation of the field exciting winding 67, the voltage of the armature 58 can be reduced to a value which will prevent the current therethrough from exceeding the desired maximum value. This reduction in the excitation of the control field exciting winding 67 is obtained by connecting a relay contactor 85 across relay contacts 86 in series with the energizing circuit of the amplidyne exciter generator control field exciting winding 81. As has been explained above, when the field exciting winding 81 is deenergized, as by opening its energizing circuit by opening the circuit between the relay contactor 85 and the contacts 86, the secondary voltage of the exciter generator 68 is rapidly reduced substantially to zero and the energization of the field exciting winding 67 is correspondingly rapidly reduced substantially to zero. This deenergization of the field exciting winding 81 is obtained by operating the relay contactor 85 by a relay armature 87 adapted to be operated by a relay operating coil 88 connected across the resistor 61 and the commutating field exciting windings 59 and 60 of the first and second main dynamo-electric machines. Thus, if the current through the armatures 14 and 58 and the electrical connection therebetween reaches a predetermined maximum value, the voltage drop across the commutating field exciting windings 59 and 60 and the resistance 61 reaches a predetermined maximum value and energizes the relay operating coil 88 so as to open the circuit between the relay contactor 85 and the relay contacts 86, thereby deenergizing the exciter generator field exciting winding 81 and consequently deenergizing the control field exciting winding 67. This results in the desired reduction of current through the connection between the armatures 14 and 58 with a consequent reduction in the voltage drop across the field exciting windings 59 and 60 and the resistance 61, thereby insufficiently energizing the relay operating coil 88 so that the relay contactor 85 again closes the circuit between the relay contacts 86 and results in the reenergization of the control field exciting winding 81 and the control field exciting winding 67. If the current in the electrical connection between the armatures 14 and 58 again reaches the predetermined maximum value, the relay 87 again opens, and this intermittent opening and closing of the energizing circuit of the exciter generator control field exciting winding 81 results in an intermittent energization and deenergization of the control field exciting winding 67 until the load on the armature 14 is reduced to such an extent that the current through the electrical connection between the armatures 14 and 58 no longer exceeds the predetermined maximum value. This maximum current value can be regulated by changing the resistance of the circuit including the relay operating coil 88, and this is obtained by connecting a variable resistor 89 in series with the operating coil 88. In order to obtain a further rapid vibrating action of the relay 87, the operating coil 88 is connected in series with a secondary winding 90 of a transformer of which the primary winding 91 is connected across the field exciting winding 67 and the secondary terminals of the exciter generator armature 68 in series with a variable resistor 92. This transformer acts to provide a rapid decrease in the voltage across the relay operating coil 88 when the voltage across the control field exciting winding 67 is decreased and to provide an increase in this voltage when the voltage across the field exciting winding 67 is increased.

It is desirable to obtain a wide range of excitation by the field exciting winding 67 and, therefore, a wide range of net excitation for the amplidyne exciter generator armature 68 in order to simulate various load conditions on the vehicle having the drive wheels 11 undergoing test. These load requirements include frictional losses, windage losses, grades, and vehicle acceleration, which are reflected as torque requirements on the vehicle driving engine. For any given setting of the field exciting winding 15 of the first dynamo-electric machine and a given energization of the control field exciting winding 81 of the amplidyne exciter generator armature 68, it is desirable that varying excitations be provided by the second dynamo-electric machine field exciting winding 67 to provide different load conditions. This is obtained in the illustrated system by the provision of a field exciting winding 93 arranged to provide a component of excitation along the secondary commutating axis of the amplidyne exciter generator armature 68, as indicated by the arrow 94. This field exciting winding is connected across the part of the loop system which includes the commutating field exciting windings 59 and 60 of the first and second main dynamo-electric machines, respectively, and the resistance 61 in opposition to a control bias voltage provided by a control circuit including a pair of resistances 95 and 96 connected in series with each other and across diametrical terminals 97 and 98 of a full-wave rectifier including four half-wave rectifiers 99. A pair of one-way rectifiers 100 and 101 is connected in series and across two resistors 95 and 96. The full-wave rectifier is adapted to provide a bias voltage across the terminals 97 and 98 by connecting the other pair of diametric terminals 102 and 103 across a secondary winding 104 of a transformer having a primary winding 105 connected across a variable potentiometer 106 which is energized by the transformer secondary winding 32, the primary winding of which is connected across the source of electrical power supply 25. Energization of the field exciting winding 93 is provided by connecting one terminal thereof between the second main dynamo-electric machine armature 58 and its commutating winding 60, as indicated at 107, and connecting the other terminal thereof to a switch contactor 108 which may be closed on a contact 109 electrically connected to a point 110 between the resistors 95 and 96. An electrical conductor connects together a midway point 111 between the one-way rectifiers 100 and 101 and a point 112 connected between the first main dynamo-electric machine armature 14 and its commutating field exciting winding 59. With this arrangement, the voltage of the full-wave rectifier across the diametric terminals 97 and 98 is connected across the resistors 95 and 96 and in opposition to the voltage drop across the terminals 107 and 112 of the load loop circuit including the commutating field exciting windings 59 and 60 and the resistor 61. Thus, the excitation of the field exciting winding 93 may be varied by varying the potentiometer 106 across the transformer primary winding 105 to vary the bias voltage across the resistors 95 and 96 and current may be made to flow through the winding 93 in either direction, depending upon the difference in the voltages across the full-wave rectifier terminals 97 and 98 and that across the load loop circuit including the resistor 61. The circuit through the field exciting winding with this construction is from the terminal 107, through the field exciting winding 93 to the switch contactor 108, to the contact 109, the resistor midway point 110, through one of the resistors 95 or 96, one of the one-way rectifiers 100 or 101, to their common connection point 111, to the terminal 112, through the commutating field exciting winding 59, the resistor 61, the commutator field exciting winding 60, back to the terminal 107. As explained above, current may flow in either direction, depending upon whether the drop across the load loop between the terminals 107 and 112 is higher or lower than the drop across one of the bias resistances 95 or 96. Thus, the net excitation provided to the amplidyne exciter generator armature 68 may be increased over that provided by the control field exciting winding 61 if the excitation of the field exciting winding 93 is in the same direction as that of the field exciting winding 61 and may be reversed in direction if the excitation provided by the field exciting winding 93 is opposed to and greater than the component of excitation provided by the control field exciting winding 61. This provides for a wide range of load conditions which may be imposed upon the load being tested by the loading roller members 10.

It has been found that certain types of vehicles offer a resistance to the passage of the vehicle through the air which is substantially proportional to the square of the speed of the vehicle. This function varies with different vehicles, depending upon the contours of the vehicle. It, therefore, is desirable at times that the torque imposed by the armature 14 of the first main dynamo-electric machine should vary substantially in response to the square of the speed of this machine. This may be obtained by varying the voltage across the machine substantially in response to the square of the speed of the machine, and this voltage may be varied in this manner by a corresponding variation in a component of energization of the control field exciting winding 67 of the second main dynamo-electric machine. This component of energization of the control field exciting winding 67 is obtained by providing a corresponding component of excitation along the secondary commutating axis of the exciter generator armature 68 by the field exciting winding 93. In order to provide this variation in the component of excitation provided by the field exciting winding 93 responsive substantially to the square of the speed of the armature 14, the switch contactor 108 is adapted to be electrically connected to a contact 113, as shown in the figure, which is electrically connected in series with an auxiliary exciter armature 114 provided with a commutating field exciting winding 115 electrically connected to the midway point 110 between the resistances 95 and 96. The auxiliary exciter armature 114 is arranged to provide a voltage which varies substantially with the square of the speed of the armature 14 by being excited by a field exciting winding 116 connected across the first dynamo-electric machine armature 14 and commutating winding 15 and in series with a variable control resistance 117. The auxiliary exciter armature 114 is mechanically connected by a suitable shaft 118 to the rotatable member or armature 119 of a driving motor connected across the first dynamo-electric machine armature 14 and commutating field exciting winding 59 and in series with its commutating field exciting winding 120. Excitation is provided to the driving motor armature 119 by a separately excited field exciting winding 121 connected across the direct current source of electrical power supply 30 through the switch contactors 44 and contacts 45. Thus the motor armature 19 is adapted to run at a speed proportional to the voltage across the first dynamo-electric machine armature 14 and commutating field exciting winding 59 and, therefore, proportional to the speed of the armature 14, and drives the auxiliary generator armature 114 at a speed proportional to the speed of the first dynamo-electric machine armature 14. Since the excitation of the auxiliary exciter field exciting winding 116 is proportional to the voltage across the first dynamo-electric machine armature 14 and commutating field exciting winding 59, the excitation provided by this field exciting winding 116 also is responsive to the speed of the first dynamo-electric machine armature 14. Therefore, the voltage induced in the auxiliary exciter armature 114 varies with the speed of the armature 114 and also with the excitation of the field exciting winding 116, both of which are responsive to the speed of the first dynamo-electric machine armature 14 which results in a voltage induced in the auxiliary exciter armature 114 responsive substantially to the square of the speed of the first dynamo-electric machine armature 14. This voltage is connected in opposition to the bias voltage provided by the full-wave rectifier across one of the resistances 95 or 96, and the complete circuit for the field exciting winding 93 with this source of excitation is substantially the same as that set forth above with the addition of the auxiliary exciter voltage. With this arrangement, a component of energization of the field exciting winding 67 of the second main dynamo-electric machine is made to vary inherently by a variation component of excitation of the amplidyne exciter generator armature 68 responsive substantially to the square of the speed of the armature 14 of the first dynamo-electric machine. The use of this component of excitation may or may not be required, and can be readily inserted or removed from the system by connecting the switch contactor 108 to the switch contacts 113 or 109, respectively.

While we have illustrated and described a particular embodiment of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

We claim:

1. A test system including a chassis dynamometer having a loading member and a first dynamo-electric machine having a rotatable member mechanically connected to said loading member, a second dynamo-electric machine having a rotatable member electrically connected to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, a control field exciting winding for said second dynamo-electric machine, means for controlling said second dynamo-electric machine control field exciting winding, and means for varying the energization of said second dynamo-electric machine control field exciting winding including a variation component responsive substantially to the square of the speed of said rotatable member of said first dynamo-electric machine.

2. A test system including a chassis dynamometer having a loading member and a first dynamo-electric machine having a rotatable member mechanically connected to said loading member, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, means for controlling the excitation of said first dynamo-electric machine control field exciting winding, a control field exciting winding for said second dynamo-electric machine, means for controlling the excitation of said second dynamo-electric machine control field exciting winding to operate said second dynamo-electric machine as a motor and a generator for driving and being driven respectively by said third dynamo-electric machine, and means for varying the energization of said second dynamo-electric machine control field exciting winding including a variation component responsive to substantially the square of the speed of said rotatable member of said first dynamo-electric machine.

3. A test system including a chassis dynamometer having a loading member and a first dynamo-electric machine having a rotatable member mechanically connected to said loading member, a second dynamo-electric machine having a rotatable member electrically connected to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, a control field exciting winding for said second dynamo-electric machine, means for controlling said second dynamo-electric machine control field exciting winding, means for varying the energization of said second dynamo-electric machine control field exciting winding for varying the voltage induced in said second dynamo-electric machine rotatable member above and below the voltage induced in said first dynamo-electric machine rotatable member to provide motoring and generating torques respectively to said first dynamo-electric machine rotatable member, and means for varying the energization of said second dynamo-electric machine control field exciting winding including a variation component responsive substantially to the square of the speed of said rotatable member of said first dynamo-electric machine.

4. A test system including a chassis dynamometer having a loading member and a first dynamo-electric machine having a rotatable member mechanically connected to said loading member, a second dynamo-electric machine having a rotatable member electrically connected to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, a control field exciting winding for said second dynamo-electric machine, means for controlling said second dynamo-electric machine control field exciting winding, means for varying the energization of said second dynamo-electric machine control field exciting winding for varying the voltage induced in said second dynamo-electric machine rotatable member above and below the voltage induced in said first dynamo-electric machine rotatable member to provide motoring and generating torques respectively to said first dynamo-electric machine rotatable member, and means for varying the energization of said second dynamo-electric machine control field exciting winding including a variation component responsive substantially to the square of the speed of said rotatable member of said first dynamo-electric machine.

5. A test system including a chassis dynamometer having a load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, means for controlling said first dynamo-electric machine control field exciting winding, a control field exciting winding for said second dynamo-electric machine, means for controlling said second dynamo-electric machine control field exciting winding, means responsive to current in said electrical connection between said first and second dynamo-electric machine rotatable members for controlling the energization of said second dynamo-electric machine control field exciting winding to limit the current in said electrical connection to predetermined maximum values, and means for varying the value of said predetermined maximum value of current in said electrical connection of said dynamo-electric machine rotatable members to which said current responsive means responds.

6. A test system including a chassis dynamometer having a load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for exciting said first dynamo-electric machine, means for energizing and controlling said first dynamo-electric machine control field exciting winding, a control field exciting winding for said second dynamo-electric machine, means for energizing and controlling said second dynamo-electric machine control field exciting winding, means for varying the energization of said second dynamo-electric machine control field exciting winding including a variation component responsive substantially to the square of the speed of said rotatable member of said first dynamo-electric machine, and means responsive to current in said electrical connection between said first and second dynamo-electric machine rotatable members for controlling the energization of said second dynamo-electric machine control field exciting winding to limit the current in said electrical connection to predetermined maximum values.

7. A test system including a chassis dynamometer having a load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for exciting said first dynamo-electric machine, means for energizing and controlling said first dynamo-electric machine control field exciting winding, a control field exciting winding for said second dynamo-electric machine, means for energizing and controlling said second dynamo-electric machine control field exciting winding, means for varying the energization of said second dynamo-electric machine control field exciting winding including a variation component responsive substantially to the square of the speed of said rotatable member of said first dynamo-electric machine, means responsive to current in said electrical connection between said first and second dynamo-electric machine rotatable members for controlling the energization of said second dynamo-electric machine control field exciting winding to limit the current in said electrical connection to predetermined maximum values, and means for varying the value of said predetermined maximum value of current in said electrical connection of said dynamo-electric machine rotatable members to which said current responsive means responds.

8. A test system including a chassis dynamometer having a load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, means including a control field exciting winding for exciting said first dynamo-electric machine, means for controlling the excitation of said first dynamo-electric machine control field exciting winding, a control field exciting winding for said second dynamo-electric machine, means for controlling the excitation of said second dynamo-electric machine control field exciting winding to operate said second dynamo-electric machine as a motor and a generator for driving and being driven respectively by said third dynamo-electric machine, means responsive to current in said electrical connection between said first and second dynamo-electric machine rotatable members for controlling the energization of said second dynamo-electric machine control field exciting winding to limit the current in said electrical connection to predetermined maximum values, and means for varying the limiting value of said predetermined maximum value of current in said electrical connection between said dynamo-electric machine rotatable members to which said current responsive means responds.

9. A test system including a chassis dynamometer having a loading member and a first dynamo-electric machine having a rotatable member mechanically conected to said loading member, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply for supplying and absorbing electrical power relative to said source of electrical power supply when said second dynamo-electric machine operates as a motor and a generator respectively, a control field exciting winding for said first dynamo-electric machine, a control field exciting winding for said second dynamo-electric machine, dynamo-electric means for energizing and controlling said second dynamo-electric machine control field exciting winding to operate said second dynamo-electric machine as a motor and a generator for driving and being driven respectively by said third dynamo-electric machine, means including a first field exciting winding for said dynamo-electric means for controlling the current thereof, means for varying the energization of said first field exciting winding of said dynamo-electric means for varying the energization of said second dynamo-electric machine control field exciting winding substantially as the square of the speed of said rotatable member of said first dynamo-electric machine, and means including a second field exciting winding for said dynamo-electric means for providing a control component of excitation thereto in opposition to said dynamo-electric means first field exciting winding.

10. A test system including a chassis dynamometer having a loading member and a drive shaft mechanically connected to said loading member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply for supplying and absorbing electrical power relative to said source of electrical power supply when said second dynamo-electric machine operates as a motor and a generator respectively, a control field exciting winding for said first dynamo-electric machine, a control field exciting winding for said second dynamo-electric machine, dynamo-electric means for energizing and controlling said second dynamo-electric machine control field exciting winding to operate said second dynamo-electric machine as a motor and a generator for driving and being driven respectively by said third dynamo-electric machine, means including a field exciting winding for said dynamo-electric means for controlling the current thereof, means for varying the energization of said field exciting winding of said dynamo-electric means for varying the voltage induced in said second dynamo-electric machine rotatable member above and below the voltage induced in said first dynamo-electric machine rotatable member to provide for motoring and generating torques respectively to said first dynamo-electric machine rotatable member, and means for varying the energization of said field exciting winding of said dynamo-electric means for varying the energization of said second dynamo-electric machine control field exciting winding substantially as the square of the speed of said rotatable member of said first dynamo-electric machine.

11. A test system including a chassis dynamometer having a load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for exciting said first dynamo-electric machine, means for energizing and controlling said first dynamo-electric machine control field exciting winding, a control field exciting winding for said second dynamo-electric machine, means for energizing and controlling said second dynamo-electric machine control field exciting winding, means for varying the energization of said second dynamo-electric machine control field exciting winding for varying the voltage induced in said second dynamo-electric machine rotatable member above and below the voltage induced in said first dynamo-electric machine rotatable member to provide motoring and generating torques respectively to said first dynamo-electric machine rotatable member, means for varying the energization of said second dynamo-electric machine control field exciting winding including a variation component responsive substantially to the square of the speed of said rotatable member of said first dynamo-electric machine, and means responsive to current in said electrical connection between said first and second dynamo-electric machine rotatable members for controlling the energization of said second dynamo-electric machine control field exciting winding to limit the current in said electrical connection to predetermined maximum values.

12. A test system including a chassis dynamometer having a loading member and a first dynamo-electric machine having a rotatable member mechanically connected to said loading member, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for said first dynamo-electric machine, a control field exciting winding for said second dynamo-electric machine, means for controlling the excitation of said second dynamo-electric machine control field exciting winding to operate said second dynamo-electric machine as a motor and a generator for driving and being driven respectively by said third dynamo-electric machine, means for varying the energization of said second dynamo-electric machine control field exciting winding including a variation component responsive to substantially the square of the speed of said rotatable member of said first dynamo-electric machine, means responsive to current in said electrical connection between said first and second dynamo-electric machine rotatable members for controlling the energization of said second dynamo-electric machine control field exciting winding to limit the current in said electrical connection to predetermined maximum values, and means for varying the limiting value of said predetermined maximum value of current in said electrical connection between said dynamo-electric machine rotatable members to which said current responsive means responds.

13. A test system including a chassis dynamometer having a loading member and a drive shaft mechanically connected to said loading member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply for supplying and absorbing electrical power relative to said source of electrical power supply when said second dynamo-electric machine operates as a motor and a generator respectively, a control field exciting winding for said first dynamo-electric machine, a control field exciting winding for said second dynamo - electric machine, dynamo - electric means for energizing and controlling said second dynamo-electric machine control field exciting winding to operate said second dynamo-electric machine as a motor and a generator for driving and being driven respectively by said third dynamo-electric machine, means including a field exciting winding for said dynamo-electric means for controlling the energizing current thereof, means for varying the energization of said first field exciting winding of said dynamo-electric means for varying the voltage induced in said second dynamo-electric machine rotatable member above and below the voltage induced in said first dynamo-electric machine rotatable member to provide for motoring and generating torques respectively to said first dynamo-electric machine rotatable member, and means including a second field exciting winding for said dynamo-electric means for providing a control component of excitation thereto in opposition to said dynamo-electric means first field exciting winding.

14. A test system including a chassis dynamometer having a frictional load engaging member and a first dynamo-electric machine having a rotatable member mechanically connected to said load engaging member, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply, a control field exciting winding for exciting said first dynamo-electric machine, a control field exciting winding for said second dynamo-electric machine, means for energizing and controlling said second dynamo-electric machine control field exciting winding, means for varying the energization of said second dynamo-electric machine control field exciting winding for varying the voltage induced in said second dynamo-electric machine rotatable member above and below the voltage induced in said first dynamo-electric machine rotatable member to provide motoring and generating torques respectively to said first dynamo-electric machine rotatable member, means for varying the energization of said second dynamo-electric machine control field exciting winding including a variation component responsive substantially to the square of the speed of said rotatable member of said first dynamo-electric machine, means responsive to current in said electrical connection between said first and second dynamo-electric machine rotatable members for controlling the energization of said second dynamo-electric machine control field exciting winding to limit the current in said electrical connection to a predetermined maximum value, and means for varying the response of said current responsive control means for varying said predetermined maximum value of current in said electrical connection of said dynamo-electric machine rotatable members.

15. A test system including a chassis dynamometer having a mechanical load engaging member and a drive shaft mechanically connected to said load engaging member, a first dynamo-electric machine having a rotatable member mechanically connected to said drive shaft, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply for supplying and absorbing electrical power relative to said source of electrical power supply when said second dynamo-electric machine operates as a motor and a generator respectively, a control field exciting winding for said first dynamo-electric machine, means for energizing and controlling said first dynamo-electric machine, means for energizing and controlling said first dynamo-electric machine control field exciting winding, a control field exciting winding for said second dynamo-electric machine, means for energizing and controlling said second dynamo-electric machine control field exciting winding for varying the voltage induced in said second dynamo-electric machine rotatable member above and below the voltage induced in said first dynamo-electric machine rotatable member to provide motoring and generating torques respectively to said first dynamo-electric machine rotatable member, means responsive to current in said electrical connection between said first and second dynamo-electric machine rotatable members for controlling the energization of said second dynamo-electric machine control field exciting winding to limit the current in said electrical connection to predetermined maximum values, and means for varying the limiting value of said predetermined maximum value of current in said electrical connection between said dynamo-electric machine rotatable members to which said current responsive means responds.

16. A test system including a chassis dynamometer having a loading member and a first dynamo-electric machine having a rotatable member mechanically connected to said loading member, a second dynamo-electric machine having a rotatable member, means for electrically connecting said second dynamo-electric machine rotatable member to said first dynamo-electric machine rotatable member, a source of electrical power supply, a third dynamo-electric machine mechanically connected to said second dynamo-electric machine rotatable member and electrically connected to said source of electrical power supply for supplying and absorbing electrical power relative to said source of electrical power supply when said second dynamo-electric machine operates as a motor and a generator respectively, a control field exciting winding for said first dynamo-electric machine, a control field exciting winding for said second dynamo-electric machine, dynamo-electric means for energizing and controlling said second dynamo-electric machine control field exciting winding to operate said second dynamo-electric machine as a motor and a generator for driving and being driven respectively by said third dynamo-electric machine, means including a first field exciting winding for said dynamo-electric means for controlling the energizing current thereof, means for varying the energization of said first field exciting winding of said dynamo-electric means for varying the voltage induced in said second dynamo-electric machine rotatable member above and below the voltage induced in said first dynamo-electric machine rotatable member to provide for motoring and generating torques respectively to said first dynamo-electric machine rotatable member, means for varying the energization of said first field exciting winding of said dynamo-electric means for varying the energization of said second dynamo-electric machine control field exciting winding including a variation component responsive substantially to the square of the speed of said rotatable member of said first dynamo-electric machine, and means including a second field exciting winding for said dynamo-electric means for providing a control component of excitation thereto in opposition to said dynamo-electric means first field exciting winding.

MARTIN A. EDWARDS.
DONALD E. GARR.
BURR S. WEAVER.

CERTIFICATE OF CORRECTION.

Patent No. 2,347,037.   April 18, 1944.

MARTIN A. EDWARDS, ET AL.

It is hereby certified that error appears in the printed specification of the above numbered patent requiring correction as follows: Page 2, first column, line 59, for "acros" read --across--; page 8, second column, lines 34 to 36 inclusive, claim 15, strike out the words and comma "means for energizing and controlling said first dynamo-electric machine,"; and that the said Letters Patent should be read with this correction therein that the same may conform to the record of the case in the Patent Office.

Signed and sealed this 6th day of June, A. D. 1944.

Leslie Frazer

Acting Commissioner of Patents.

(Seal)